United States Patent
Guemmer (10) Patent No.: US 8,118,555 B2
(45) Date of Patent: Feb. 21, 2012

(54) FLUID-FLOW MACHINE AND ROTOR BLADE THEREOF

(75) Inventor: Volker Guemmer, Mahlow (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 1021 days.

(21) Appl. No.: 12/068,147

(22) Filed: Feb. 4, 2008

(65) Prior Publication Data

US 2008/0219852 A1   Sep. 11, 2008

(30) Foreign Application Priority Data

Feb. 2, 2007   (DE) .......................... 10 2007 005 384

(51) Int. Cl.
*F04D 21/00* (2006.01)
(52) U.S. Cl. ............... 416/181; 416/235; 416/236 R; 416/237; 416/223 R; 416/241 R
(58) Field of Classification Search ............... 416/181, 416/235, 236 R, 237, 223 A, 241 R
See application file for complete search history.

(56) References Cited

U.S. PATENT DOCUMENTS

| | | | |
|---|---|---|---|
| 1,606,887 A * | 11/1926 | Moody | 60/689 |
| 1,903,823 A | 4/1933 | Lougheed | |
| 3,304,056 A * | 2/1967 | Sohma | 415/169.4 |
| 3,578,264 A * | 5/1971 | Kuethe | 244/200.1 |
| 3,993,414 A * | 11/1976 | Meauze et al. | 415/181 |
| 4,822,249 A * | 4/1989 | Eckardt et al. | 416/235 |
| 4,975,023 A * | 12/1990 | Miura et al. | 416/237 |
| 6,358,012 B1 | 3/2002 | Staubach | |
| 6,416,289 B1 * | 7/2002 | Ramesh et al. | 416/235 |
| 7,207,772 B2 | 4/2007 | Johann | |
| 2005/0214113 A1 * | 9/2005 | Johann | 415/181 |

FOREIGN PATENT DOCUMENTS

| | | |
|---|---|---|
| EP | 1580399 | 9/2005 |
| GB | 2032048 | 4/1980 |

OTHER PUBLICATIONS

German Search Report dated Oct. 13, 2011 from counterpart foreign application.

* cited by examiner

*Primary Examiner* — Igor Kershteyn
(74) *Attorney, Agent, or Firm* — Timothy J. Kilma; Shuttlesworth & Ingersoll, PLC (57) ABSTRACT

A fluid-flow machine, especially for an aircraft engine, includes a rotor having rotor blades 3. The rotor blades 3 include, on a suction side 9, at least two zones of different surface finish, with one zone being positioned between a rotor blade 3 leading edge 5, a casing line 1, a line SLM and a line EL and being provided with a boundary layer-energizing surface structure, with the line SLM being a meridional flow line at a Mach number-critical blade height of the rotor, and with the line EL being a connecting line of all points E to form a chord-orthogonal projection line EL.

22 Claims, 11 Drawing Sheets

FIG. 1

FIG. 2 STATE OF THE ART

Chord-orthogonal projection line PL

Extended chord-orthogonal projection line EL

Meridional flow line at a Mach number-critical blade height SLM

Meridional flow line at a tip swirl-critical blade height SLW

Delimited zones of different surface roughness of the blade suction side produced by forming, post-treatment or coating, with the roughness value $R_a$ differing by at least 0.4 μm and occupying more than 5 % of the suction side area or with oblique orientation to the leading edge and to the meridional flow direction Surface cross-structure in partial areas of the blade suction side, produced by forming, material removal or build-up and characterized by step edges orientated obliquely to the leading edge and the meridional flow direction

FLUID-FLOW MACHINE AND ROTOR BLADE THEREOF

This application claims priority to German Patent Application DE 102007005384.5 filed Feb. 2, 2007, the entirety of which is incorporated by reference herein.

The present invention relates to fluid-flow machines, such as blowers, compressors, pumps and fans of the axial, semi-axial and radial type using gaseous or liquid working media.

More particularly, the present invention relates to blades of fluid-flow machines, such as blowers, compressors, pumps and fans of the axial, semi-axial or radial type. The working medium (fluid) may be gaseous or liquid.

The fluid-flow machine may include one or several stages, each having a rotor and a stator, in individual cases, the stage only having a rotor. The rotor includes a number of blades, which are connected to the rotating shaft of the machine and transfer energy to the working medium. The rotor may be designed with or without shrouds at the outward blade ends. The stator includes a number of stationary blades, which may either feature a fixed or a free blade end on the hub and on the casing side. Rotor drum and blading are usually enclosed by a casing; in other cases (e.g. aircraft or ship propellers) no such casing exists. The machine may also feature a stator, a so-called inlet guide vane assembly, upstream of the first rotor. Departing from the stationary fixation, at least one stator or inlet guide vane assembly may be rotatably borne, to change the angle of attack. Variation is accomplished for example via a spindle accessible from outside of the annulus. In an alternative configuration, multi-stage types of the fluid-flow machines may have two counter-rotating shafts, with the direction of rotation of the rotor blade rows alternating between stages. Here, no stators exist between subsequent rotors. Finally, the fluid-flow machine may—alternatively—feature a bypass configuration such that the single-flow annulus divides into two concentric annuli behind a certain blade row, with each of these annuli housing at least one further blade row.

The flow in the tip area of the rotors of a fluid-flow machine, such as blowers, compressors, pumps and fans, is, though this is often neglected in the design, of non-stationary, i.e. time-variant, nature. Accordingly, an observer at rest would be able to perceive reciprocal depressions of the individual blades as they pass in circumferential direction of the machine—a long known phenomenon.

Lesser known is a pulsation of the flow field in the blade tip area which is frequently found in the relative system of the rotor and which is attributable to unstable, unsteady behavior of the leakage flow at the radial gap. This radial gap leakage, which is often associated with flow separation at the casing wall, leads to a strongly time-variant constriction of the rotor flow duct, thus influencing the behavior of the profile boundary layers in the blade sections near the casing. In particular, with transonic rotors, this strong, periodically occurring disturbance of the profile envelopment leads to losses as regards the efficiency and the surge margin of the fluid-flow machine. Also, the life of the rotor blades concerned and/or the disks carrying these blades may be affected.

One way to resolve this problem is a special structuring of the casing in the running area of the blades by so-called casing treatments. A design of the blades themselves to dampen or suppress the pulsation of the airfoil tip flow by energizing the profile boundary layers in casing-near blade sections is not known.

However, means applied to the blade surface are known which are intended to fix the transition point from laminar to turbulent of the profile boundary layer on transonic rotors. The transition fixation means are very narrow, orientated vertically to the flow (see EP-A-1 580 399) and based on the assumption of a two-dimensional flow in the specified range of application.

Remedying pulsation of the flow in the airfoil tip area of the rotors of fluid-flow machines by providing structures or installations in the casing entails high design investment and complex layout work and will, in most cases, reduce efficiency. Due to simplifying assumptions, the transition fixation means proposed in the state of the art are only of limited effect.

In a broad aspect, the present invention provides a fluid-flow machine, especially for an aircraft engine, as well as a rotor blade of a fluid-flow machine, which features improved efficiency, while being characterized by simple design and easy, cost-effective producibility.

One object of the present invention is to provide, in particular, a fluid-flow machine resp. a rotor blade, especially for an aircraft engine with at least one bladed rotor, with the rotor blade featuring, on a suction side, at least two zones of different surface finish, with one zone being positioned between a rotor blade leading edge, a casing line, a line SLM and a line EL and being provided with a boundary layer-energizing surface structure, with the line SLM being a meridional flow line at a Mach number-critical blade height of the rotor, and with the line EL being a connecting line of all points E to form a chord-orthogonal projection line EL.

More particularly, the present invention provides for a special form of the suction-side surface design on at least one rotor blade of the fluid-flow machine, aimed at improving the operating performance and/or the service-life of the fluid-flow machine.

The present invention provides for a rotor blade for use in a fluid-flow machine which, on its suction side, features at least two zones of different surface finish such that either:

a) a boundary layer-energizing structure is provided in at least one of the zones which is produced by forming, material removal or build-up and is characterized by at least one step edge orientated obliquely to the leading edge and to the meridional flow direction, or b) a higher surface roughness exists in at least one of the zones which is produced by forming, post-treatment, particle impingement and/or coating and, with regard to the roughness value $R_a$, differs by at least 0.4 μm to the adjacent zones, and which either occupies more than 5 percent of the suction side area or is essentially oblique to the leading edge and the meridional flow line.

The present invention is more fully described in the light of the accompanying drawings showing preferred embodiments. In the drawings.

Figure 1:
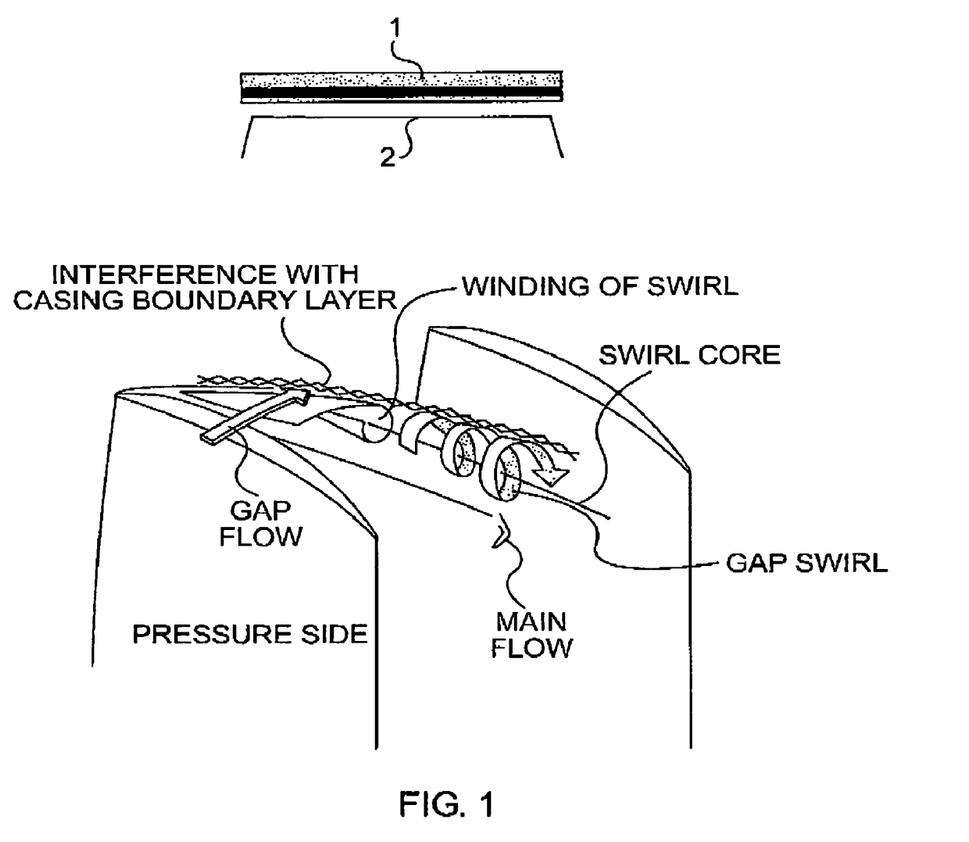
FIG. 1 is a sketch of the leakage flow at the rotor radial gap.

FIG. 1 is a sketch of the principal leakage flow processes at the rotor radial gap, with the two arrows indicating the main flow and the gap flow. It also shows the interference with the casing boundary layer and the gap swirl with swirl core.

Figure 2:
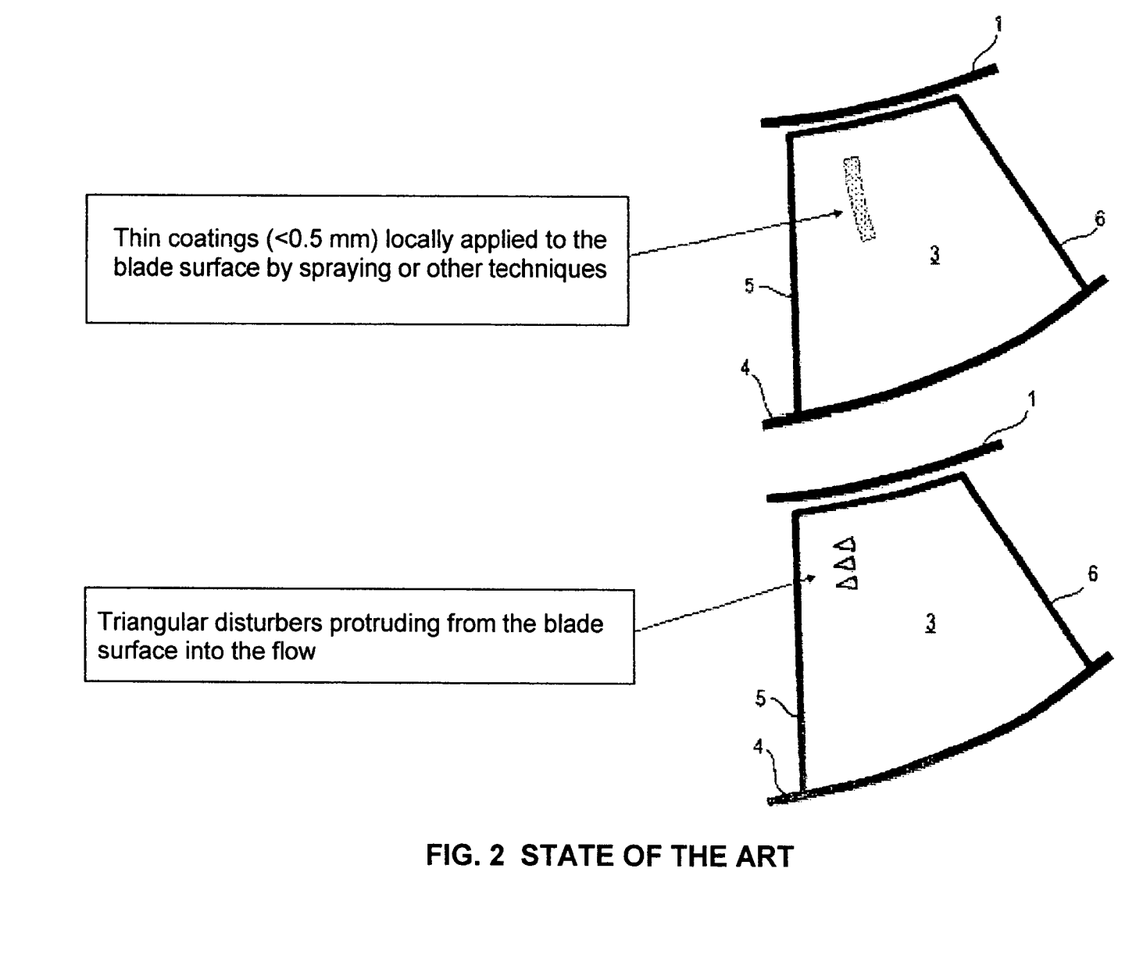
FIG. 2 is a schematic representation of rotors according to the state of the art.
Figure 3A:
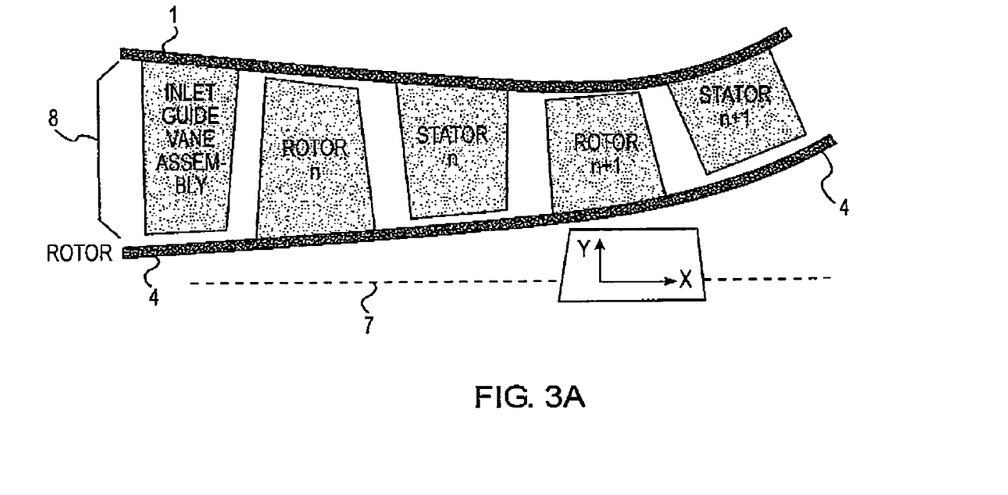
FIG. 3 shows possible configurations of fluid-flow machines relevant to the present invention, FIG. 4 provides a definition of meridional flow lines and flow line profile sections.
Figure 3B:
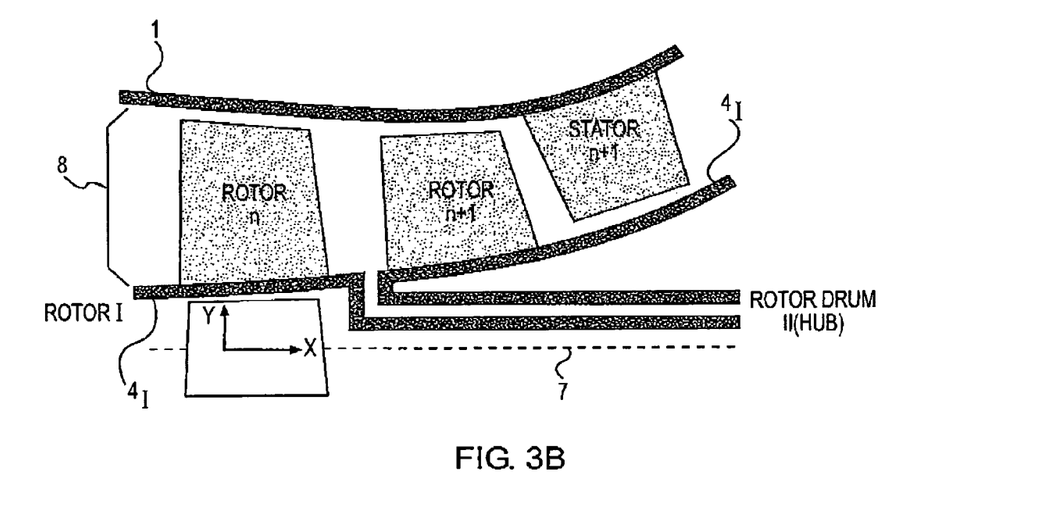
Figure 3C:
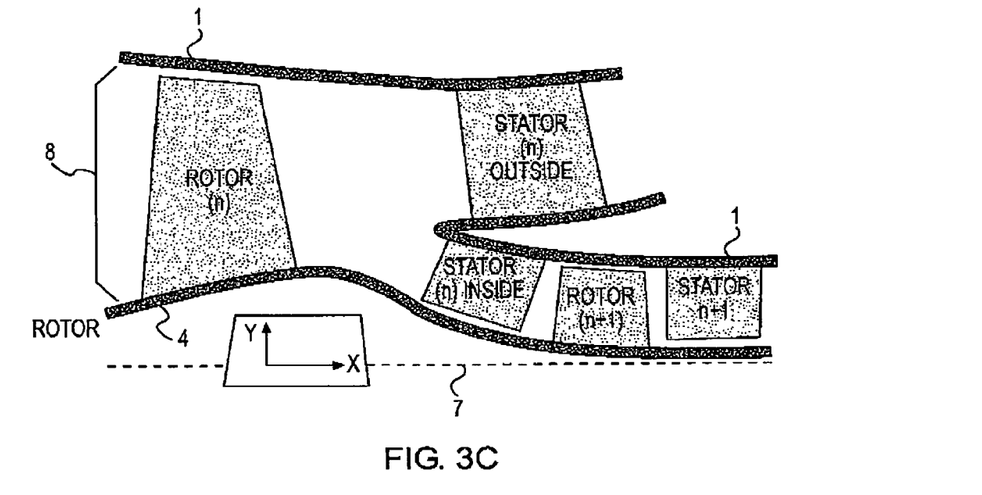
Figure 3D:
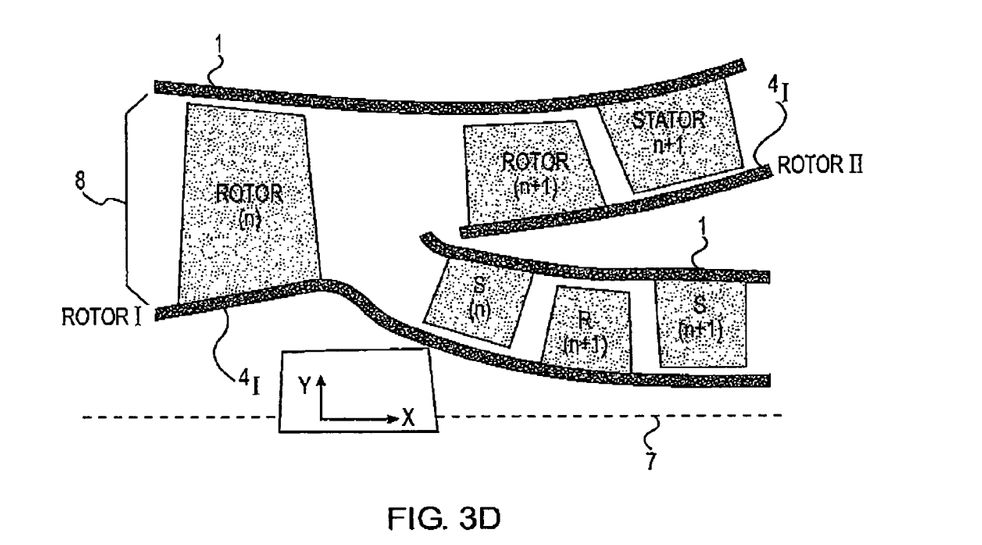

FIG. 2 is a schematic representation of rotor blades according to the state of the art, with triangular disturbers or thin coatings being applied to the blade surface. The top embodiment in FIG. 2 shows a configuration with a strip of material sprayed onto the blade surface and being oriented either essentially parallel to the leading edge or perpendicular to the meridional flow direction. The bottom embodiment in FIG. 2 shows a row of distortion wedges applied to the blade surface, which again according to the state of the art are oriented along a line either essentially parallel to the leading edge or perpendicular to the meridional flow direction.

FIG. 3 shows four possible configurations of fluid-flow machines according to this specification.

Figure 4:
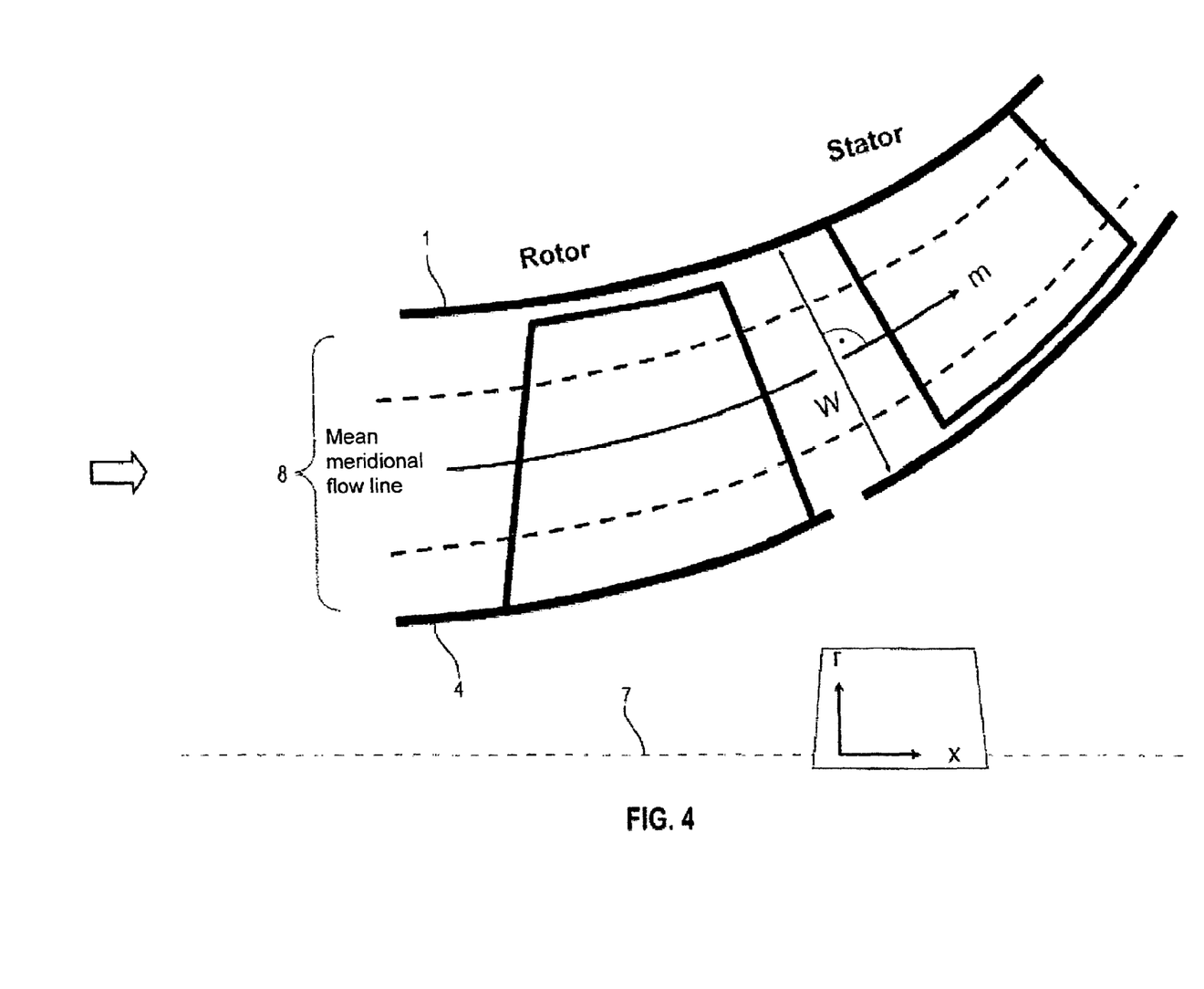

FIG. 4 provides a definition of the meridional flow lines and the flow line profile sections. The mean meridional flow line is established by the geometrical center of the annulus. If a perpendicular line is erected at any point on the mean flow line, the development of annulus width W along the flow path and a number of perpendiculars is obtained by means of which, with equal relative division in the direction of the duct height, further meridional flow lines are obtained. The section of a meridional flow line with a blade provides a flow line profile section.

Figure 5:
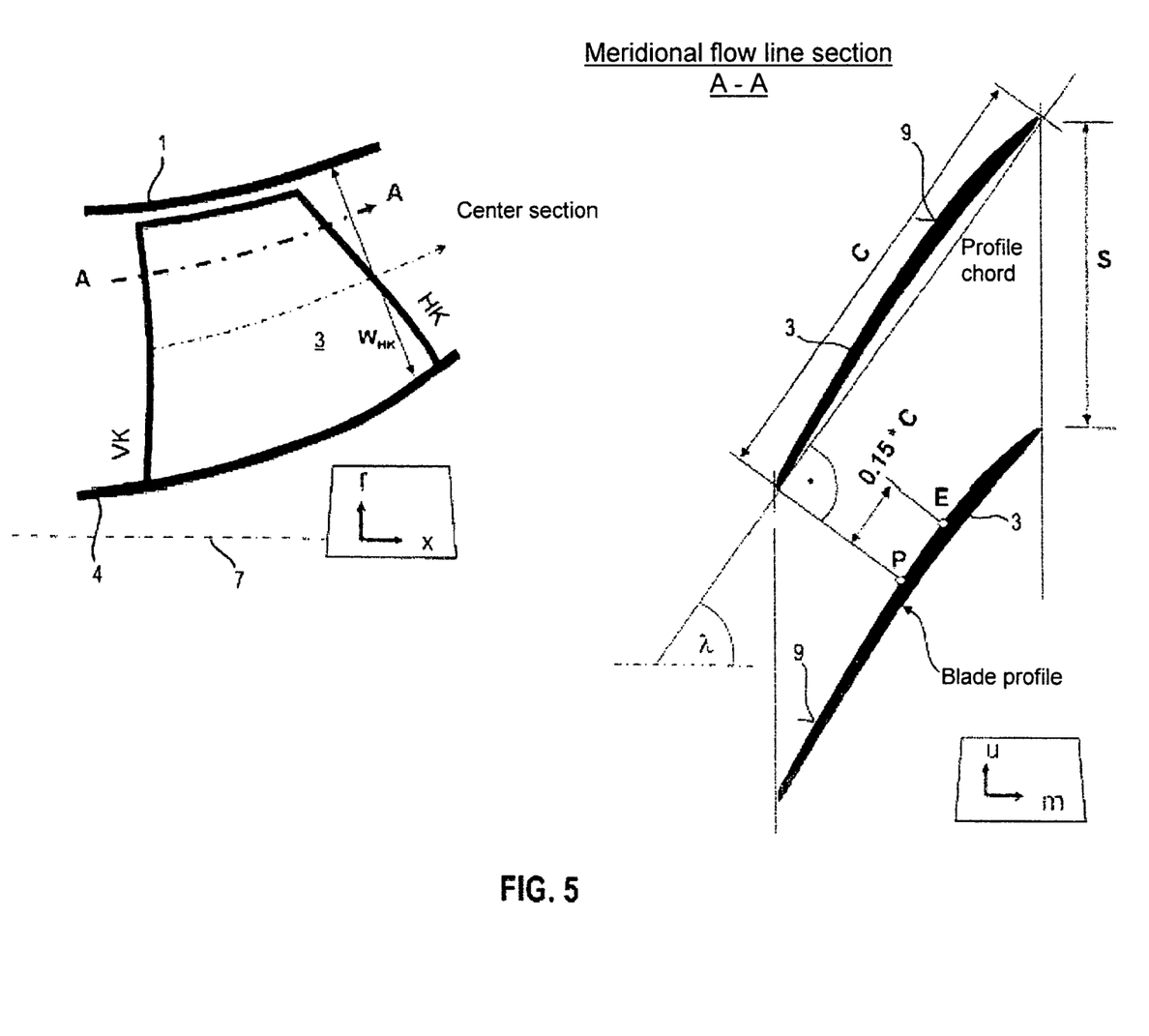
FIG. 5 shows geometrical rotor dimensions relevant to the present invention.

FIG. 5 shows the dimensions of a rotor that are necessary to establish the limiting lines according to the present invention. Shown in the meridional view of the rotor, on the left-hand side of the illustration, is the trailing-edge duct height WHK which is measured perpendicular to the mean flow line. The right-hand side of the illustration shows a meridional flow line section A-A at a typical blade height, looking radially outward. Defined here are the profile chord length C, the spacing of two blades S, the point P established by vertical projection on the suction side of the adjacent profile, and the point E situated further downstream by 15 percent of the chord length.

Figure 6:
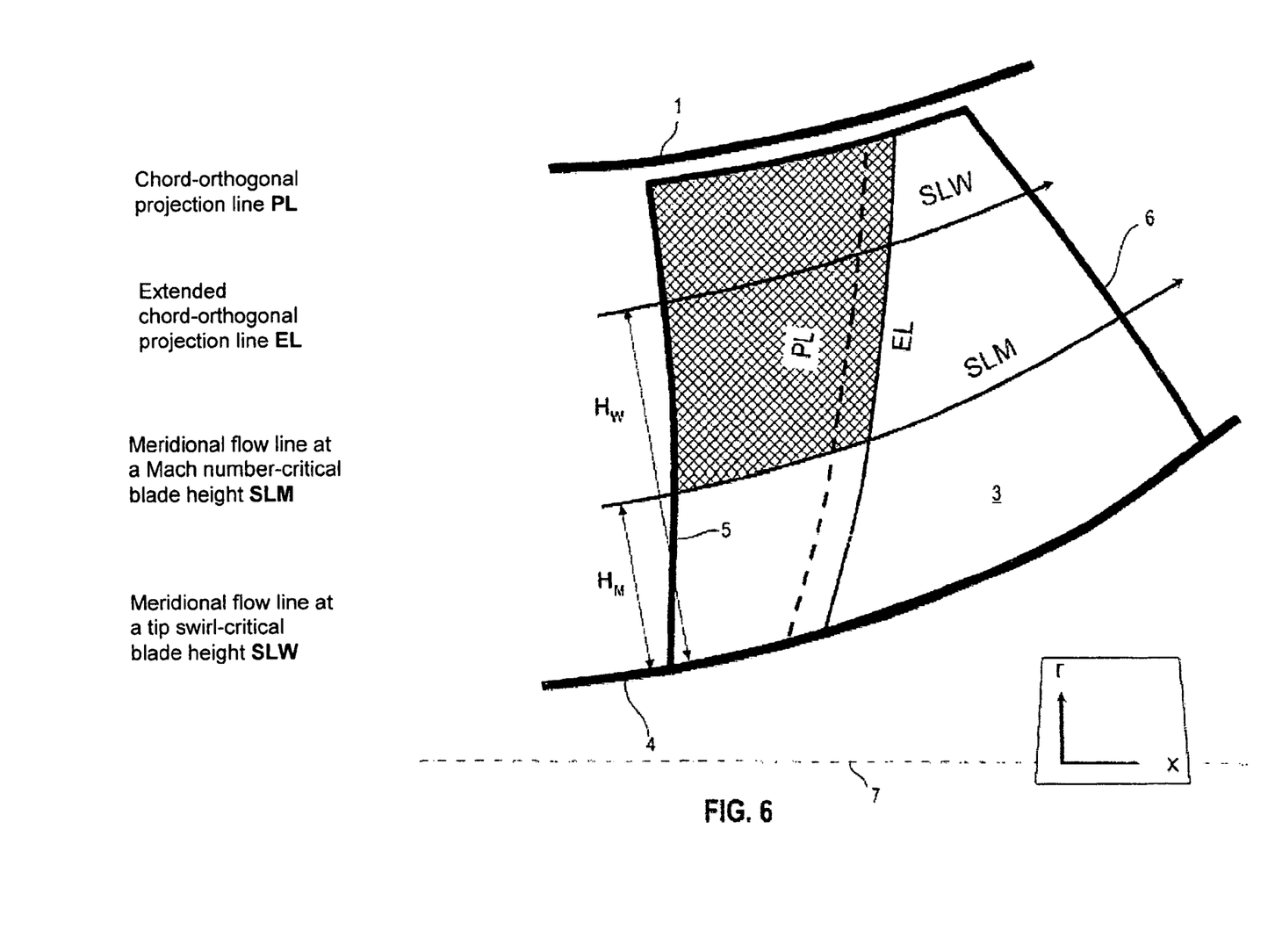
FIG. 6 shows limiting lines (suction side) according to the present invention.

FIG. 6 shows, in meridional view of the rotor, four different limiting lines necessary for selecting the position of the surface cross-structure, or the zones of higher roughness, according to the present invention. Line PL is established by joining all points P of the blade sections of the blade. Line EL is established by joining all points E. Line SLM designates the meridional flow line at the blade height of the rotor at which the relative inflow Mach number is 1. It is located at a constant relative height HM/W. Line SLW designates the meridional flow line at the blade height of the rotor up to which, from the casing, a strong influence of the gap leakage flow or the gap swirl, respectively, is to be expected. It is located at the constant relative height $$HW/W=0.95-(S/WHK)(0.35+0.15(1-\cos \lambda)).$$

The stagger angle lambda used here and the spacing of two rotor blades S are measured in the blade section immediately on the casing.

Figure 7:
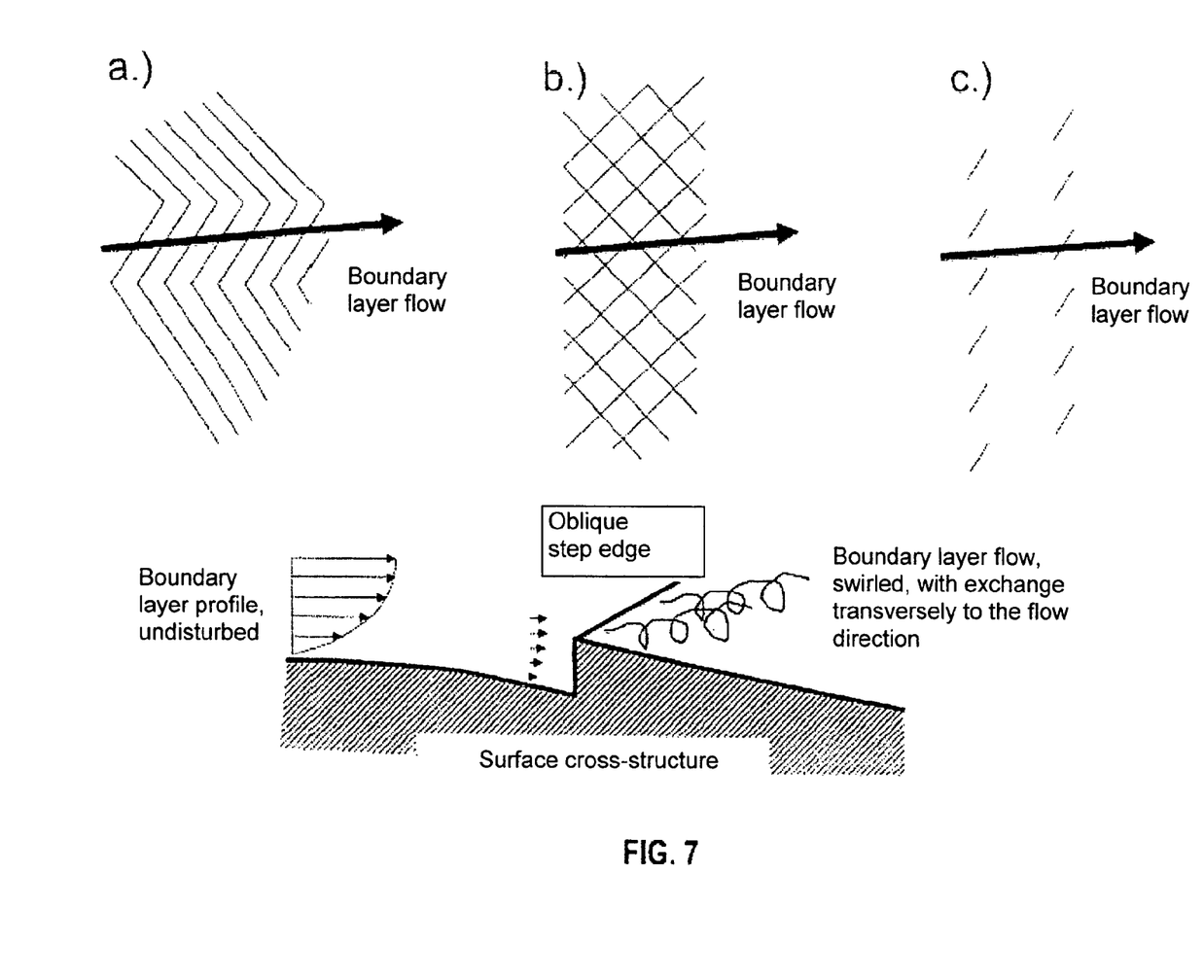
FIG. 7 shows a surface structure according to the present invention.

FIG. 7 shows different surface cross-structures provided by the present invention whose common feature is the production of swirl structures by the appurtenant step edges orientated transversely to the boundary layer flow, with these swirl structures providing for mixing of the boundary layer transversely to the direction of flow (along the surface), see bottom part of the illustration.

Figure 8:
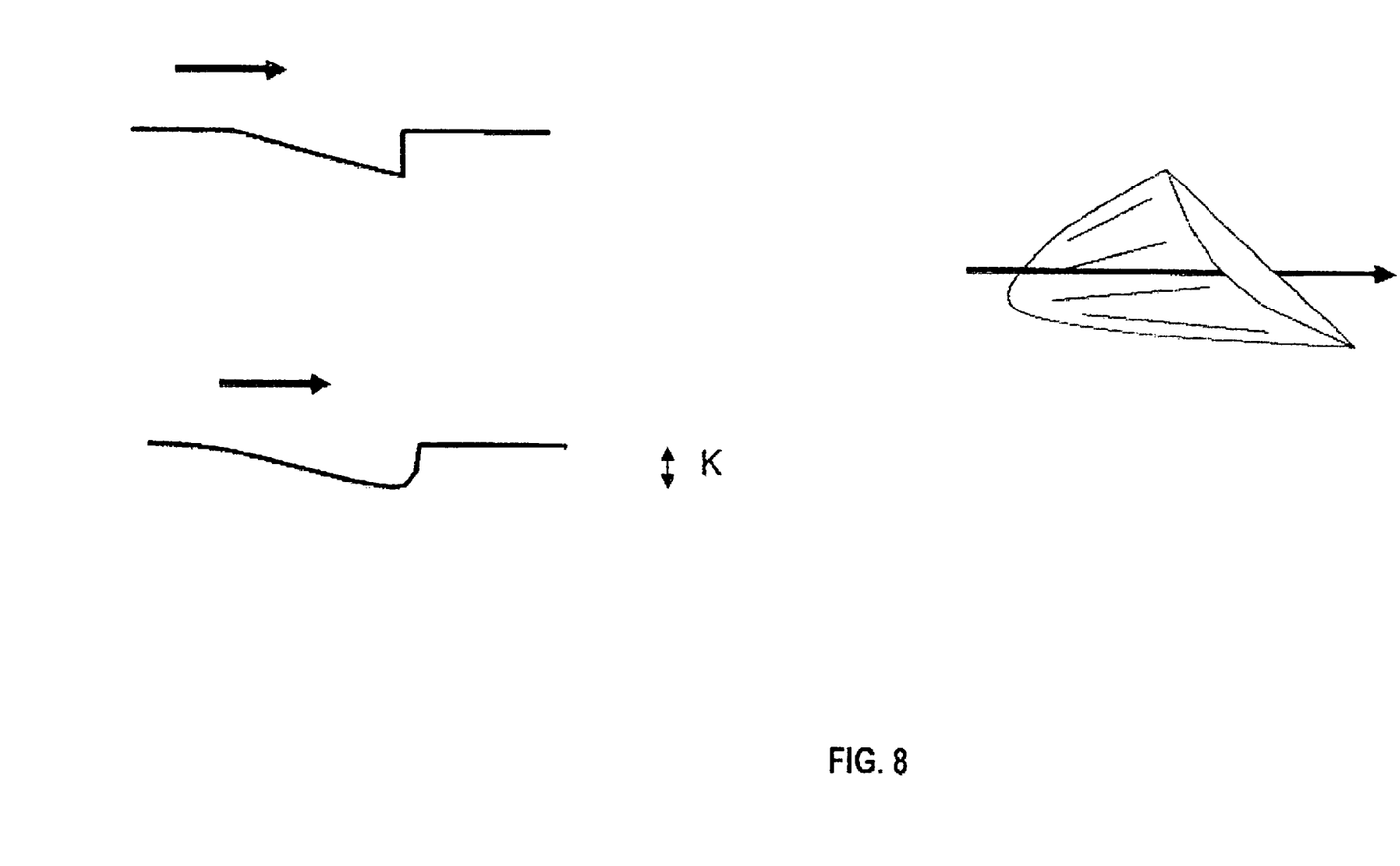
FIG. 8 shows examples for the creation of oblique step edges according to the present invention.

FIG. 8 shows examples of embodiments of the step edges which, as indicated in FIG. 7, can extend continuously over longer distances or over interrupted, short sections only. For example, recesses which extend flatly towards the oblique edges, with pointed or also rounded corners, are applicable. Alternatively, the edge itself can be a protrusion beyond the surface. Also possible are dimple-type individual recesses or corresponding protrusions on the surface. K is here the height in the size of the boundary layer thickness.

Figure 9:
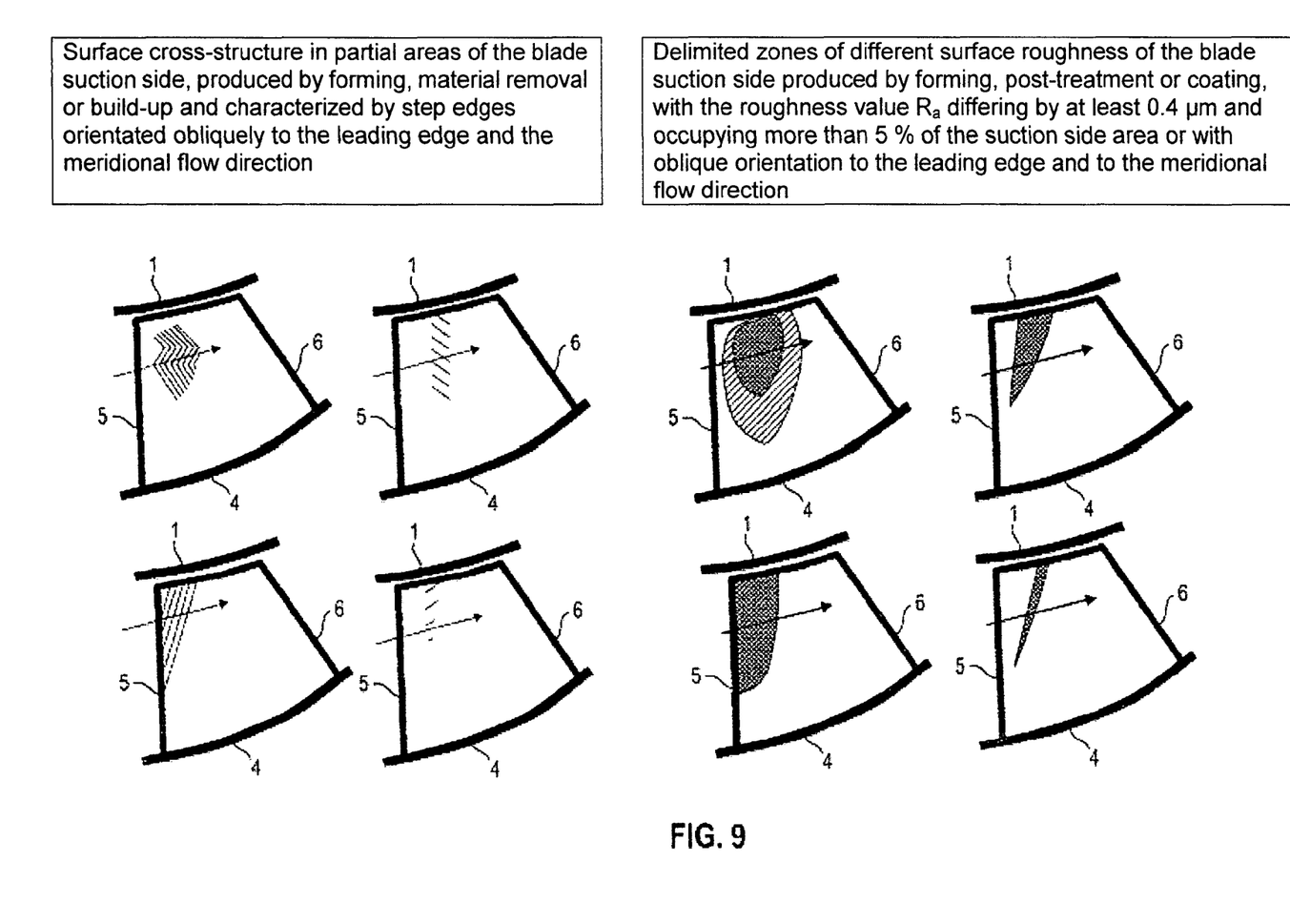
FIG. 9 shows other solutions according to the present invention.

FIG. 9 finally shows a number of arrangements according to the present invention.

Figure 10:
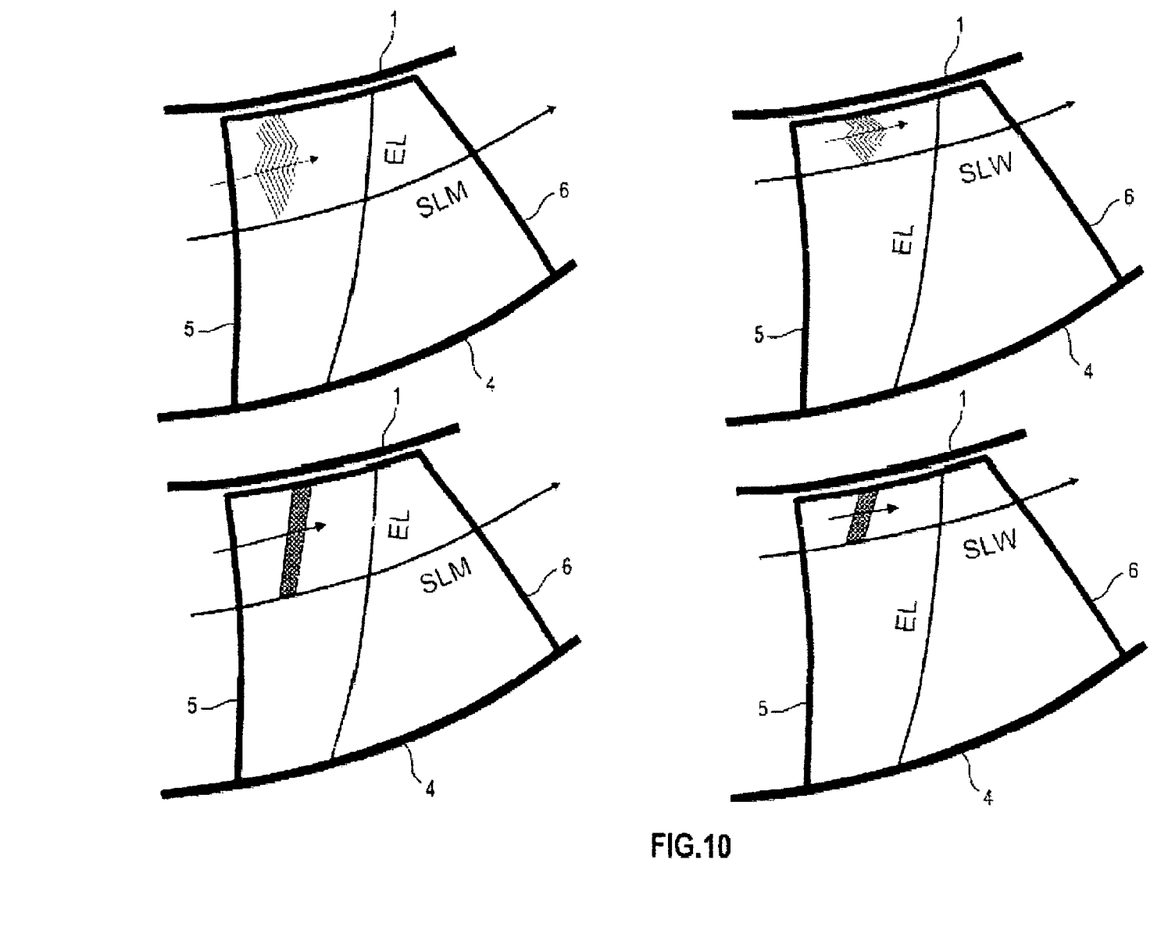
FIG. 10 shows other particularly favorable solutions according to the present invention.

FIG. 10 shows particularly effective solutions according to the present invention, in which the surface cross-structure, or the zone of increased roughness, is arranged in the area between leading edge, casing line, line SLM and line EL. It is particularly effective if the surface cross-structure, or the zone of increased roughness, is arranged in the area between leading edge, casing line, line SLW and line EL.

The present invention provides for steadying and smoothing the flow in the blade rim area, thus enabling, in particular on rotors, disturbances of the operating behavior arising therefrom to be avoided in critical cases. In particular, vibratory wear phenomena in the fan blade root area which are caused by flow instabilities in the blade tip area are highly efficiently reduced by the present invention. An increase of stage efficiency by approx. 0.5 percent appears to be realistic. Application of the concept to the fan of an aircraft engine with approx. 25,000 lbs thrust leads to a reduction of the specific fuel consumption by up to 0.5 percent. A possible gain in stability, i.e. an increase of the surge margin, of the fluid-flow machine is calculated at approx. 5 percent.

LIST OF REFERENCE NUMERALS

1 Casing/casing line
2 Rotor tip
3 Rotor blade
4 Hub (rotor drum)
5 Leading edge
6 Trailing edge
7 Machine axis
8 Annulus
9 Suction side

What is claimed is:

1. A fluid-flow machine with at least one rotor having rotor blades, wherein at least one of the rotor blades includes, on a suction side, at least two zones of different surface finish, with one zone being positioned between a rotor blade leading edge, a casing line, a line SLW and a line EL and being provided with a boundary layer-energizing surface structure, with the line SLW extending on a relative duct height HW/W defined as follows:

$$HW/W=0.95-(S/WHK)(0.35+0.15(1-\cos \lambda)),$$

where:
the line EL is a connecting line of all points E to form a chord-orthogonal projection line EL and where each point E is positioned further downstream by 15 percent of a chord length of the rotor blade from a corresponding point P established by vertical projection on the rotor blade suction side of an adjacent rotor blade profile,
lambda is a stagger angle at a rotor casing section,
S is a spacing of two rotor blades at the rotor casing section,
WHK is a trailing edge duct width, W is a duct width, and HW is a distance between a hub and the line SLW measured in a direction of the duct width;

wherein the boundary layer-energizing structure comprises at least one step edge orientated obliquely to the leading edge and a meridional flow direction.

2. The fluid-flow machine in accordance with claim 1, wherein the step edge extends continuously.

3. The fluid-flow machine in accordance with claim 1, wherein the step edge extends over interrupted short sections of the rotor blade.

4. The fluid-flow machine in accordance with claim 1, wherein the step edge is a flat recess with pointed/rounded corners which extend towards an oblique edge.

5. The fluid-flow machine in accordance with claim 1, wherein the step edge is in the form of dimple-type individual recesses.

6. The fluid-flow machine in accordance with claim 1, wherein the step edge is in the form of protrusions on the surface of the rotor blade.

7. The fluid-flow machine in accordance with claim 1, wherein the boundary layer-energizing structure is formed by a zone of higher surface roughness.

8. The fluid-flow machine in accordance with claim 7, wherein the surface roughness is produced by forming, post-treatment, particle impingement and/or coating.

9. The fluid-flow machine in accordance with claim 7, wherein a roughness value Ra of the surface differs by at least 0.4 µm to adjacent zones.

10. The fluid-flow machine in accordance with claim 7, wherein the boundary layer-energizing structure occupies more than 5 percent of the suction side of the rotor blade.

11. The fluid-flow machine in accordance with claim 7, wherein the boundary layer-energizing structure is essentially oblique to the leading edge and a meridional flow line.

12. A rotor blade of a rotor of a fluid-flow machine, the rotor blade including on a suction side, at least two zones of different surface finish, with one zone being positioned between a rotor blade leading edge, a casing line, a line SLW and a line EL and being provided with a boundary layer-energizing surface structure, with the line SLW extending on a relative duct height HW/W defined as follows:

$$HW/W = 0.95 - (S/WHK)(0.35 + 0.15(1 - \cos \lambda)),$$

where:

the line EL is a connecting line of all points E to form a chord-orthogonal projection line EL and where each point E is positioned further downstream by 15 percent of a chord length of the rotor blade from a corresponding point P established by vertical projection on the rotor blade suction side of an adjacent rotor blade profile, lambda is a stagger angle at a rotor casing section, S is a spacing of two rotor blades at the rotor casing section, WHK is a trailing edge duct width, W is a duct width, and HW is a distance between a hub and the line SLW measured in a direction of the duct width;

wherein the boundary layer-energizing structure comprises at least one step edge orientated obliquely to the leading edge and a meridional flow direction.

13. The rotor blade in accordance with claim 12, wherein the step edge extends continuously.

14. The rotor blade in accordance with claim 12, wherein the step edge extends over interrupted short sections of the rotor blade.

15. The rotor blade in accordance with claim 12, wherein the step edge is a flat recess with pointed/rounded corners which extend towards an oblique edge.

16. The rotor blade in accordance with claim 12, wherein the step edge is in the form of dimple-type individual recesses.

17. The rotor blade in accordance with claim 12, wherein the step edge is in the form of protrusions on the surface of the rotor blade.

18. The rotor blade in accordance with claim 12, wherein the boundary layer-energizing structure is formed by a zone of higher surface roughness.

19. The rotor blade in accordance with claim 18, wherein the surface roughness is produced by forming, post-treatment, particle impingement and/or coating.

20. The rotor blade in accordance with claim 18, wherein a roughness value Ra of the surface differs by at least 0.4 µm to adjacent zones.

21. The rotor blade in accordance with claim 18, wherein the boundary layer-energizing structure occupies more than 5 percent of the suction side of the rotor blade.

22. The rotor blade in accordance with claim 18, wherein the boundary layer-energizing structure is essentially oblique to the leading edge and a meridional flow line.

* * * * *